US012369178B2

United States Patent
Ibrahim et al.

(10) Patent No.: US 12,369,178 B2
(45) Date of Patent: Jul. 22, 2025

(54) CONCURRENT SELF-INTERFERENCE AND CROSS-LINK INTERFERENCE MEASUREMENT AND REPORTING

(71) Applicant: QUALCOMM Incorporated, San Diego, CA (US)

(72) Inventors: Abdelrahman Mohamed Ahmed Mohamed Ibrahim, San Diego, CA (US); Huilin Xu, Temecula, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/303,065

(22) Filed: May 19, 2021

(65) Prior Publication Data

US 2022/0022206 A1 Jan. 20, 2022

Related U.S. Application Data

(60) Provisional application No. 62/705,882, filed on Jul. 20, 2020.

(51) Int. Cl.
*H04W 72/54* (2023.01)
*H04L 1/00* (2006.01)
(Continued)

(52) U.S. Cl.
CPC ........... *H04W 72/54* (2023.01); *H04L 1/0068* (2013.01); *H04L 5/14* (2013.01); *H04W 72/0446* (2013.01); *H04W 72/1263* (2013.01)

(58) Field of Classification Search
CPC ......... H04W 72/1226; H04W 72/0446; H04W 72/1263; H04W 72/085; H04W 24/08;
(Continued)

(56) References Cited

U.S. PATENT DOCUMENTS 6,219,559 B1 * 4/2001 Hill ..................... H04B 17/20
455/63.1
11,375,527 B1 * 6/2022 Eyuboglu ......... H04W 72/1273
(Continued)

FOREIGN PATENT DOCUMENTS

WO WO-2020144624 A1 7/2020

OTHER PUBLICATIONS

International Search Report and Written Opinion—PCT/US2021/070858—ISA/EPO—Oct. 29, 2021.
(Continued)

*Primary Examiner* — Chirag G Shah
*Assistant Examiner* — Joshua Y Smith
(74) *Attorney, Agent, or Firm* — Arun Swain

(57) ABSTRACT

Various aspects of the present disclosure generally relate to wireless communication. In some aspects, a full-duplex user equipment (UE) may identify timing for performing an interference measurement based at least in part on a scheduled uplink transmission time. The full-duplex UE may perform, in a particular symbol and in accordance with the timing for performing the interference measurement, a self-interference measurement and a cross-link interference measurement. Numerous other aspects are provided.

30 Claims, 13 Drawing Sheets

(51) Int. Cl.
*H04L 5/14* (2006.01)
*H04W 72/0446* (2023.01)
*H04W 72/1263* (2023.01)

(58) Field of Classification Search
CPC .. H04W 72/54; H04W 72/542; H04L 1/0068;
H04L 5/14; H04L 1/0027; H04L 1/0026;
H04B 17/382; H04B 17/345; H04B 17/318
See application file for complete search history.

(56) References Cited

U.S. PATENT DOCUMENTS

| | | | | |
|---|---|---|---|---|
| 2007/0098125 | A1* | 5/2007 | Vrcelj | H04L 27/2676 375/355 |
| 2007/0153943 | A1* | 7/2007 | Nissila | H04L 25/03057 375/350 |
| 2008/0130805 | A1* | 6/2008 | Wang | H04B 17/364 375/350 |
| 2009/0245221 | A1* | 10/2009 | Piipponen | H04W 88/06 370/343 |
| 2010/0086083 | A1* | 4/2010 | Ido | H04L 27/2651 375/340 |
| 2011/0158342 | A1* | 6/2011 | Srinivasan | H04L 27/2665 375/285 |
| 2013/0107785 | A1* | 5/2013 | Bhattad | H04L 27/2665 370/312 |
| 2014/0256341 | A1* | 9/2014 | Nayeb Nazar | H04W 72/541 455/452.1 |
| 2015/0092831 | A1* | 4/2015 | Lv | H04L 25/03891 375/232 |
| 2015/0139347 | A1* | 5/2015 | Murch | H04B 7/0456 375/267 |
| 2018/0123837 | A1* | 5/2018 | Barbu | H04L 25/03987 |
| 2018/0295639 | A1* | 10/2018 | Bhushan | H04W 72/0446 |
| 2019/0245672 | A1* | 8/2019 | Fehrenbach | H04W 72/0446 |
| 2021/0194743 | A1* | 6/2021 | Gu | H04L 27/2656 |
| 2021/0306985 | A1* | 9/2021 | Eriksson | H04W 72/54 |
| 2022/0232481 | A1* | 7/2022 | Kusashima | H04W 72/0446 |

OTHER PUBLICATIONS

LG Electronics: "Motivation for new SI: Study on Flexible and Full Duplex for NR," 3GPP Draft, 3GPP TSG RAN Meeting #83, RP-190265, 3rd Generation Partnership Project (3GPP), Mobile Competence Centre, 650, Route Des Lucioles, F-06921, Sophia-Antipolis Cedex, France, vol. TSG RAN. No. Shenzhen, China, Mar. 18, 2019-Mar. 21, 2019, Mar. 14, 2019 (Mar. 14, 2019), XP051690115, 11 pages, Retrieved from the Internet: URL: http://www.3gpp.org/ftp/tsg%5Fran/TSG%5FRAN/TSGR%5F83/Docs/RP%2D190265%2Ezip [retrieved on Mar. 14, 2019], page 6, the whole document.

* cited by examiner

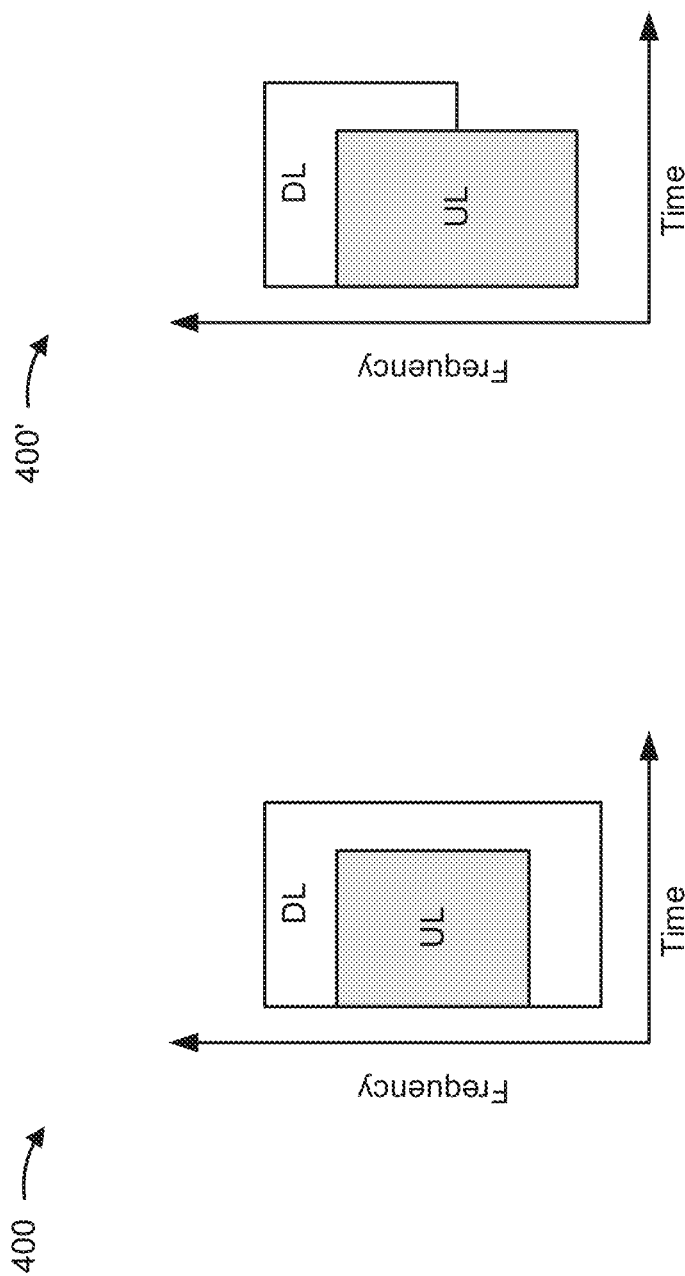

CONCURRENT SELF-INTERFERENCE AND CROSS-LINK INTERFERENCE MEASUREMENT AND REPORTING

CROSS-REFERENCE TO RELATED APPLICATION

This Patent Application claims priority to U.S. Provisional Patent Application No. 62/705,882, filed on Jul. 20, 2020, entitled "CONCURRENT SELF-INTERFERENCE AND CROSS-LINK INTERFERENCE MEASUREMENT AND REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for concurrent self-interference and cross-link interference measurement and reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a full-duplex user equipment (UE) includes: identifying timing for performing an interference measurement based at least in part on a scheduled uplink transmission time; and performing, in a particular symbol and in accordance with the timing for performing the interference measurement, a self-interference measurement and a cross-link interference measurement.

In some aspects, a method of wireless communication performed by a base station (BS) includes: configuring communication resources for a set of UEs; and receiving, based at least in part on configuring the communication resources, reporting of at least one of a self-interference measurement or a cross-link interference measurement performed concurrently by a UE, of the set of UEs, in a particular symbol.

In some aspects, a full-duplex UE for wireless communication includes: a memory, and one or more processors operatively coupled to the memory, the memory and the one or more processors configured to: identify timing for performing an interference measurement based at least in part on a scheduled uplink transmission time; and perform, in a particular symbol and in accordance with the timing for performing the interference measurement, a self-interference measurement and a cross-link interference measurement.

In some aspects, a BS for wireless communication includes: a memory, and one or more processors operatively coupled to the memory, the memory and the one or more processors configured to: configure communication resources for a set of UEs: and receive, based at least in part on configuring the communication resources, reporting of at least one of a self-interference measurement or a cross-link interference measurement performed concurrently by a UE, of the set of UEs, in a particular symbol.

In some aspects, a non-transitory computer-readable medium storing a set of instructions for wireless communication includes: one or more instructions that, when executed by one or more processors of a full-duplex UE, cause the full-duplex UE to: identify timing for performing an interference measurement based at least in part on a scheduled uplink transmission time; and perform, in a particular symbol and in accordance with the timing for performing the interference measurement, a self-interference measurement and a cross-link interference measurement.

In some aspects, a non-transitory computer-readable medium storing a set of instructions for wireless communication includes: one or more instructions that, when executed by one or more processors of a BS, cause the BS to: configure communication resources for a set of UEs; and receive, based at least in part on configuring the communication resources, reporting of at least one of a self-interference measurement or a cross-link interference measurement performed concurrently by a UE, of the set of UEs, in a particular symbol.

In some aspects, an apparatus for wireless communication includes: means for identifying timing for performing an interference measurement based at least in part on a scheduled uplink transmission time; and means for performing, in a particular symbol and in accordance with the timing for performing the interference measurement, a self-interference measurement and a cross-link interference measurement.

In some aspects, an apparatus for wireless communication includes: means for configuring communication resources for a set of UEs; and means for receiving, based at least in part on configuring the communication resources, reporting of at least one of a self-interference measurement or a cross-link interference measurement performed concurrently by a UE, of the set of UEs, in a particular symbol.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4B and 5 are diagrams illustrating examples of full duplex communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
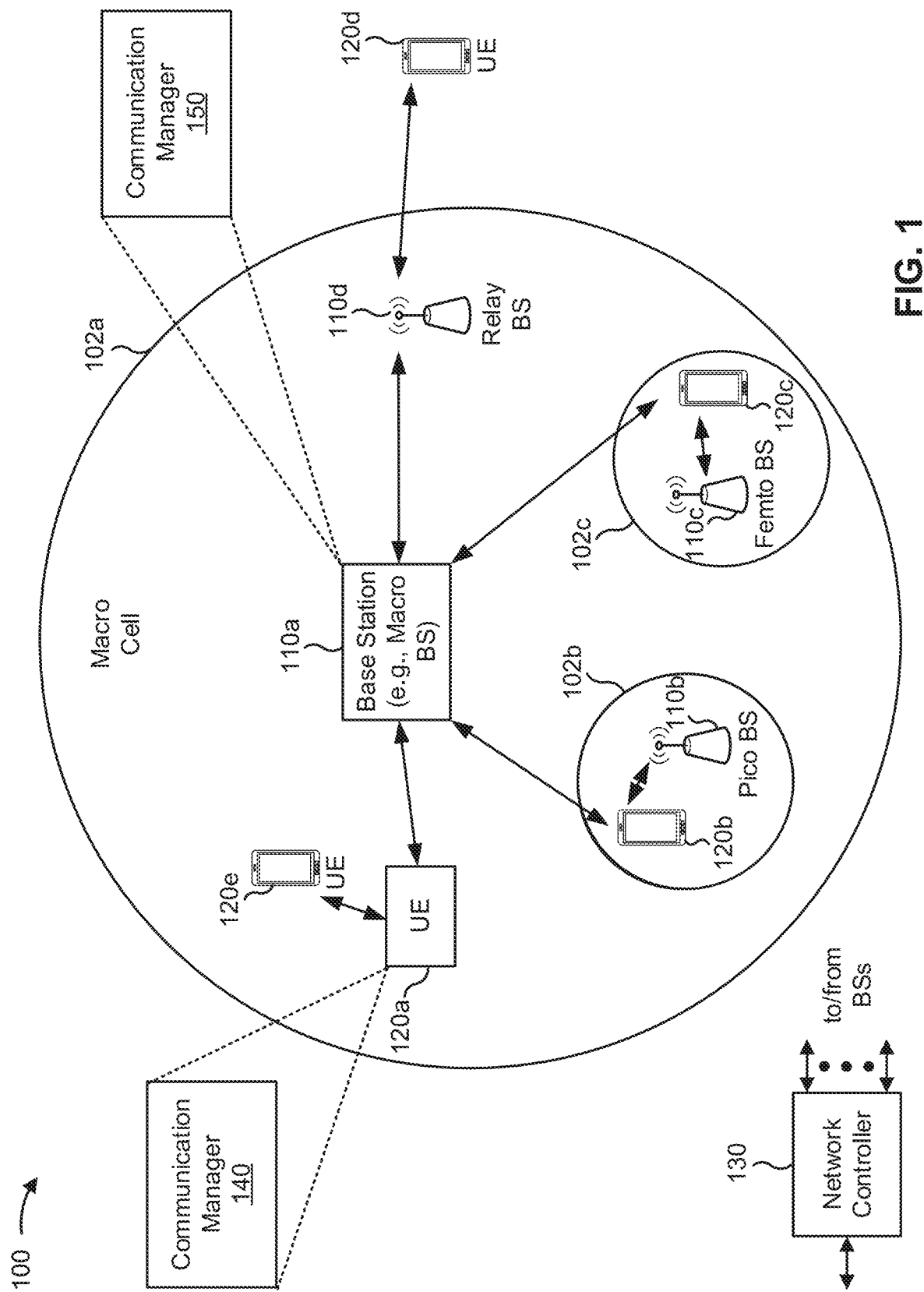
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a. 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may identify timing for performing an interference measurement based at least in part on a scheduled uplink transmission time; and perform, in a particular symbol and in accordance with the timing for performing the interference measurement, a self-interference measurement and a cross-link interference measurement. Additionally, or alternatively, the communication manager 140 may perform one or more other operations described herein.

In some aspects, the base station 110 may include a communication manager 150. As described in more detail elsewhere herein, the communication manager 150 may configure communication resources for a set of UEs; and receive, based at least in part on configuring the communication resources, reporting of at least one of a self-interference measurement or a cross-link interference measurement performed concurrently by a UE, of the set of UEs, in a particular symbol. Additionally, or alternatively, the communication manager 150 may perform one or more other operations described herein.

As indicated above, FIG. 1 is provided as an example. Other examples may differ from what is described with regard to FIG. 1.

Figure 2:
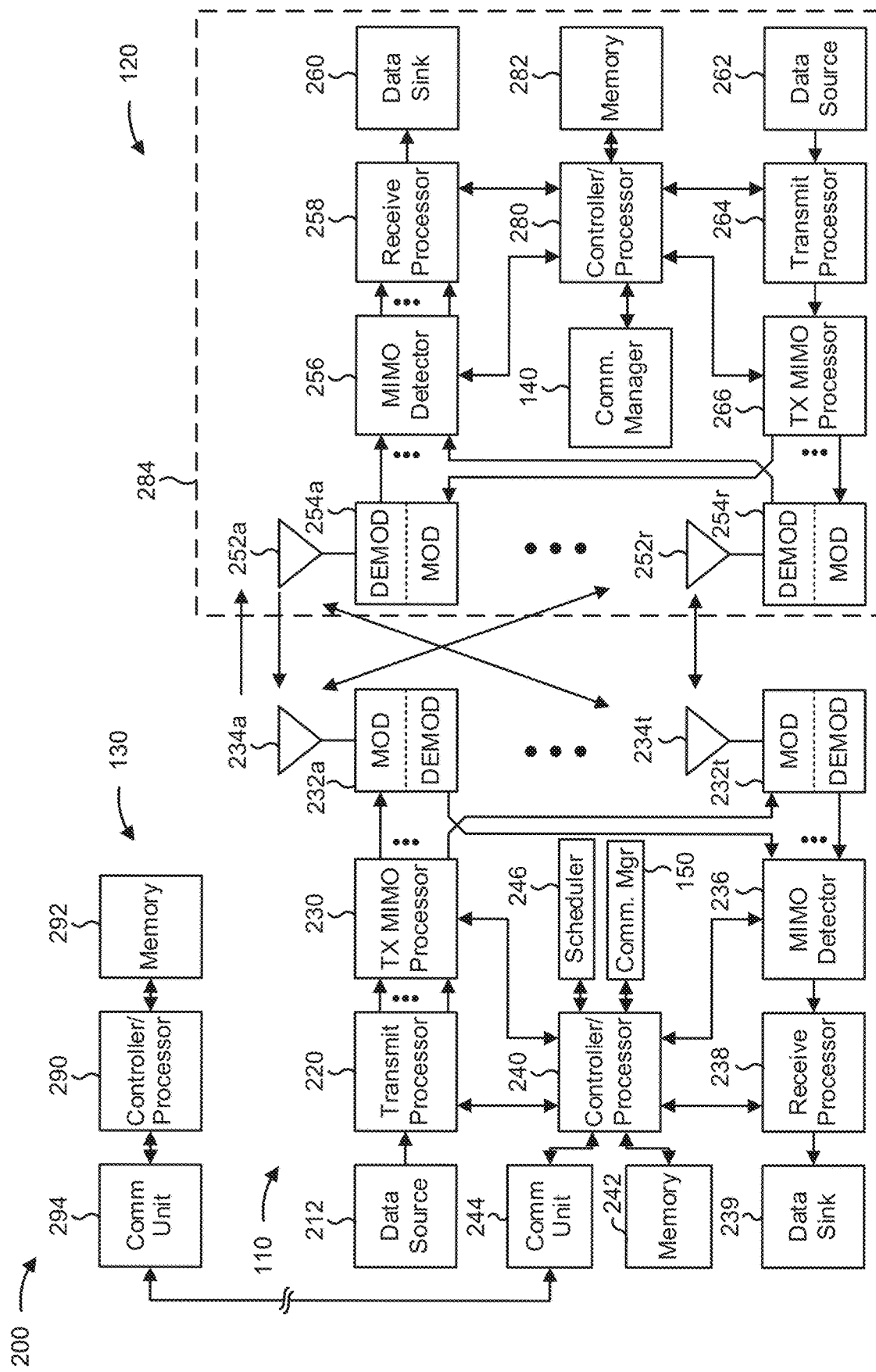
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with concurrent self-interference and cross-link interference measurement and reporting, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the full-duplex UE includes means for identifying timing for performing an interference measurement based at least in part on a scheduled uplink transmission time; and/or means for performing, in a particular symbol and in accordance with the timing for performing the interference measurement, a self-interference measurement and a cross-link interference measurement. The means for the full-duplex UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the BS includes means for configuring communication resources for a set of UEs; and/or means for receiving, based at least in part on configuring the communication resources, reporting of at least one of a self-interference measurement or a cross-link interference measurement performed concurrently by a UE, of the set of UEs, in a particular symbol. The means for the BS to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
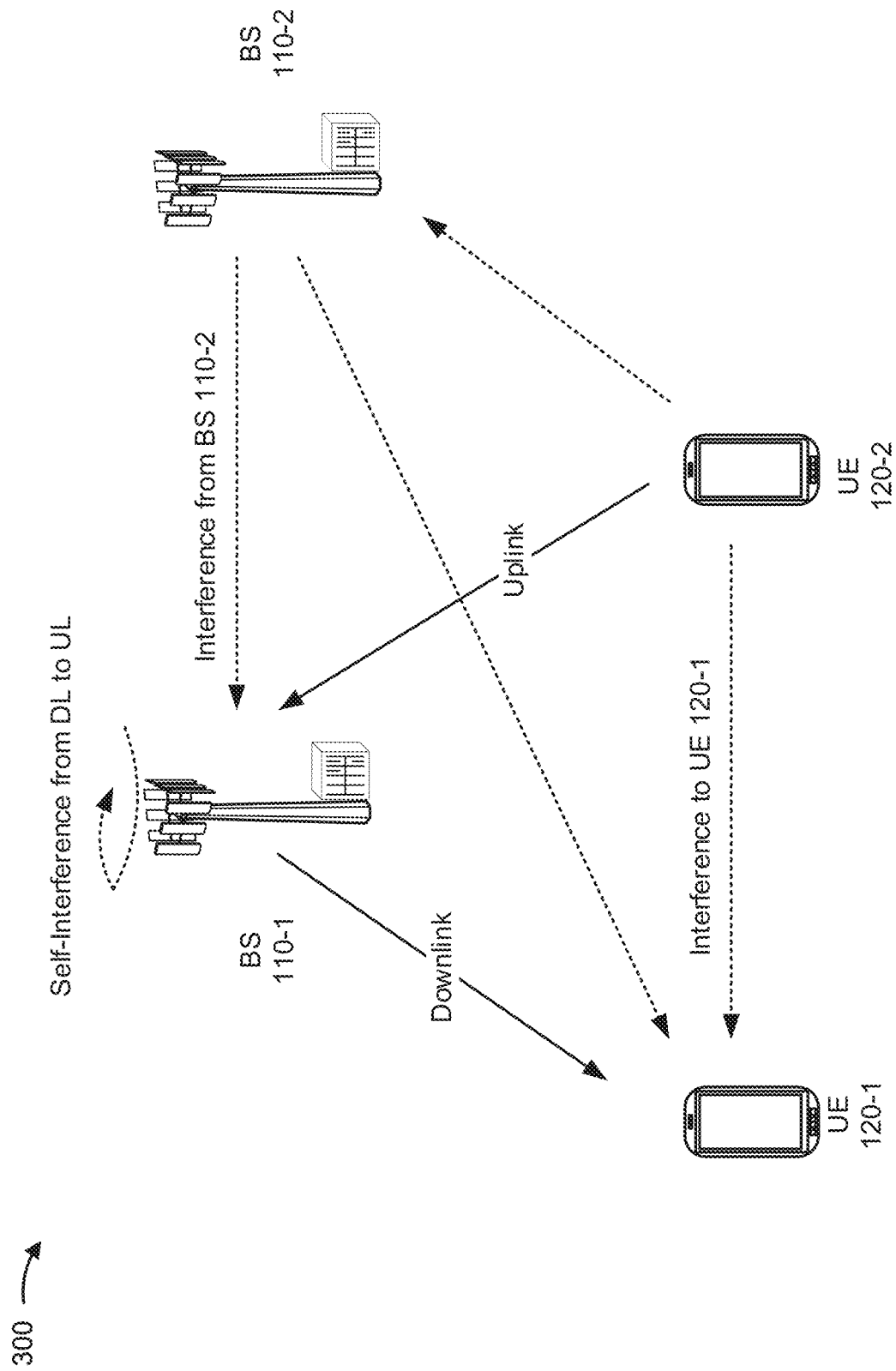
FIGS. 3A-3C are diagrams illustrating examples of interference associated with full-duplex communications, in accordance with various aspects of the present disclosure.
Figure 3B:
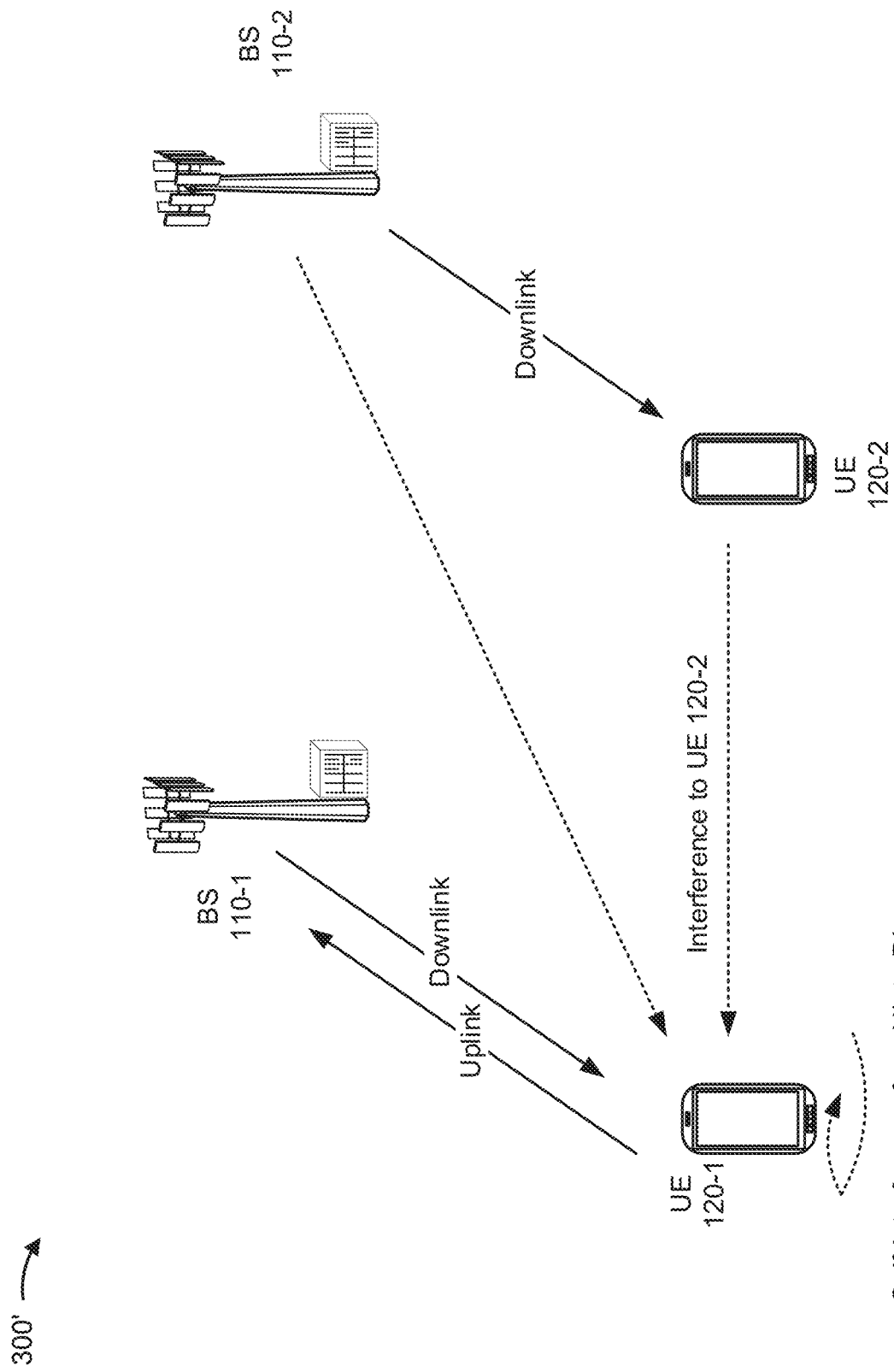
Figure 3C:
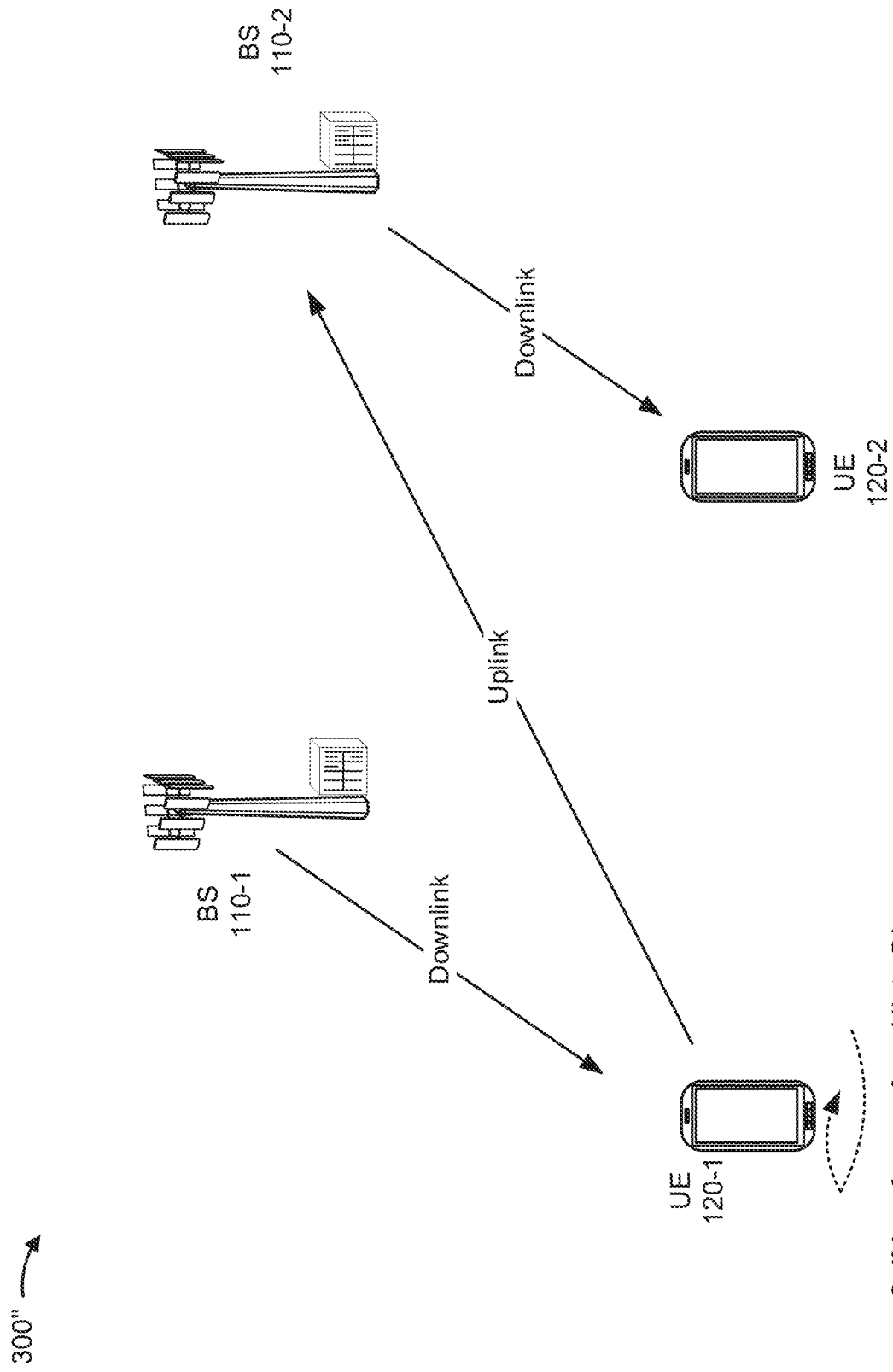

FIGS. 3A-3C are diagrams illustrating examples 300/300'/300" of interference associated with full-duplex communications, in accordance with various aspects of the present disclosure. As shown, examples 300/300'/300" include a BS 110-1, a BS 110-2, a UE 120-1, and a UE 120-2. In some aspects, BS 110-1, UE 120-1, BS 110-2, and/or the like may be capable of full-duplex communication.

Full-duplex communication may include a contemporaneous uplink and downlink communication using the same resources. For example, as shown in FIG. 3A, BS 110-1 may perform a downlink (DL) transmission to a UE 120-1 and may receive an uplink (UL) transmission from UE 120-2 using the same or different frequency resources and at least partially overlapping in time. In this case, UE 120-1 may experience interference from UE 120-2 transmitting on an uplink to BS 110-1, interference from BS 110-2 transmitting on a downlink to, for example, UE 120-2, and/or the like. Similarly, BS 110-1 may experience interference from BS 110-2, which may be transmitting on a downlink to, for example, UE 120-1. Further, the DL transmission from BS 110-1 to UE 120-1 may self-interfere with the UL transmission from UE 120-2 to BS 110-1. This may be caused by a variety of factors, such as the higher transmit power for the DL transmission (as compared to the UL transmission), radio frequency bleeding, and/or the like.

As shown in FIG. 3B, in another scenario. UE 120-1 may transmit a UL transmission to BS 110-1 and may receive a DL transmission from BS 110-1 during full-duplex operation. In this case, UE 120-1 may experience interference from UE 120-2 and/or BS 110-2 as a result of communication between BS 110-2 and UE 120-2. Additionally, or alternatively, the UL transmission may self-interfere with the DL transmission from UE 120-1 to BS 110-1. This may be caused by, for example, a higher transmit power for the UL transmission as compared to the DL transmission among other causes. As shown in FIG. 3C, UE 120-1 may receive a DL transmission from BS 110-1 and transmit a UL transmission to BS 110-2, which may also transmit a DL transmission to UE 120-2. In other words, BS 110-2 and UE 120-1 may operate in full duplex modes. In this case, the UL transmission to BS 110-2 may self-interfere with the DL transmission from BS 110-1 at UE 120-1.

As indicated above, FIG. 3 is provided as an example. Other examples may differ from what is described with respect to FIG. 3.

Figure 5:
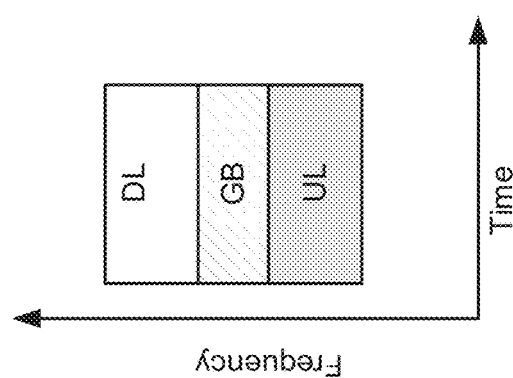

FIGS. 4A-4B and 5 are diagrams illustrating examples 400, 400', and 500 of full duplex communication, in accordance with various aspects of the present disclosure. As shown in FIGS. 4A and 4B, in-band full duplex (IBFD) deployments may enable a wireless communication device to transmit and receive using the same time resources and the same frequency resources. For example, DL resources and UL resources may at least partially (or fully) overlap in IBFD deployments. In contrast, as shown in FIG. 5, a sub-band frequency division duplexing (sub-band frequency division duplexing (FDD), which may also be termed a "Flexible Duplex" deployment or a sub-band full-duplex (SBFD)) may enable a wireless communication device to transmit using the same time resources, but different frequency resources. For example, as shown, DL resources and UL resources may be separated by a guard band (GB).

As indicated above, FIGS. 4A-4B and 5 are provided as examples. Other examples may differ from what is described with regard to FIGS. 4A-4B and 5.

In some communications systems, a full duplex (FD) BS may include a plurality of panels to enable concurrent transmission and reception. For example, an FD BS may include a first panel for DL transmission at edges of a bandwidth and a second panel for UL reception at a center of the bandwidth. In SBFD, a first portion of the band for DL transmission is separated from a second portion of the band for UL transmission by a guard band, as described above.

The BS may assign a slot with a D+U slot format. In the D+U slot format, the BS may use a band for both UL and DL transmissions. For example, in SBFD, the BS may use the D+U slot format for concurrent DL and UL communication in adjacent bands. In contrast, in IBFD, the BS may use the D+U slot format for concurrent DL and UL communication in overlapping bands. From a UE perspective, a half-duplex (HD) UE may, in a D+U slot, either transmit on an uplink or receive on a downlink. In contrast, an FD UE may concurrently transmit on the uplink and receive on the downlink (either communicating with a single BS or with a plurality of BSs, such as a first BS on the uplink and a second BS on the downlink).

As described above, in FD operation, a BS and/or a UE may experience interference. For example, a BS and/or a UE may experience self-interference (SI) as a result of UL transmissions interfering with DL transmissions and vice versa. Additionally, or alternatively, the BS and/or UE may experience cross-link interference (CLI) as a result of transmissions by another BS and/or UE interfering with reception by the BS and/or the UE. Such interference may be intra-cell (e.g., a first UE may experience CLI as a result of transmissions by a second UE within the same cell as the first UE) or inter-cell (e.g., a first UE in a first cell may experience interference as a result of transmissions by a second UE in a second cell). As an example, in SBFD, a BS may configure a first UE to transmit on an uplink at a center of a bandwidth and a second UE to receive on a downlink at edges of the bandwidth. In this case, a UL transmission by the first UE may cause CLI for the second UE when the second UE attempts to receive a DL transmission at the edges of the bandwidth.

CLI and SI in FD operation may cause a reduction to network performance. For example, CLI and/or SI may cause interference with some transmissions, which may result in the transmissions being dropped, lost, and/or the like. As a result, a BS may configure a channel state information interference measurement (CSI-IM) in a downlink bandwidth part (BWP) in a full-duplex slot. This may enable a FD-aware or FD UE to measure interference, identify a CLI portion of the interference, and report the CLI portion to the BS to enable the BS to correct for the CLI using scheduling techniques, resource allocation techniques, beamforming techniques, and/or the like. However, SI may remain an issue in FD operation.

Some aspects described herein enable concurrent performance of CLI and SI measurements as well as reporting of the CLI and SI measurements to enable corrective action to reduce an impact of CLI and/or SI to communication performance. For example, a UE may identify a CLI receive time and may use the CLI receive time to perform both an SI measurement and a CLI measurement (e.g., in the same symbol). In some cases, the UE may receive a downlink communication (e.g., a physical downlink control channel (PDCCH), a physical downlink shared channel (PDSCH), a channel state information reference signal (CSI-RS) in the same or in an adjacent symbol to a symbol in which the UE performs the SI and CLI measurements. After performing the SI and CLI measurements, the UE may autonomously perform a corrective action and/or report a result of the SI and CLI measurements to a BS to enable corrective action to be performed. In this way, the UE and the BS enable a reduction in interference for FD communications, thereby improving network performance.

Figure 6:
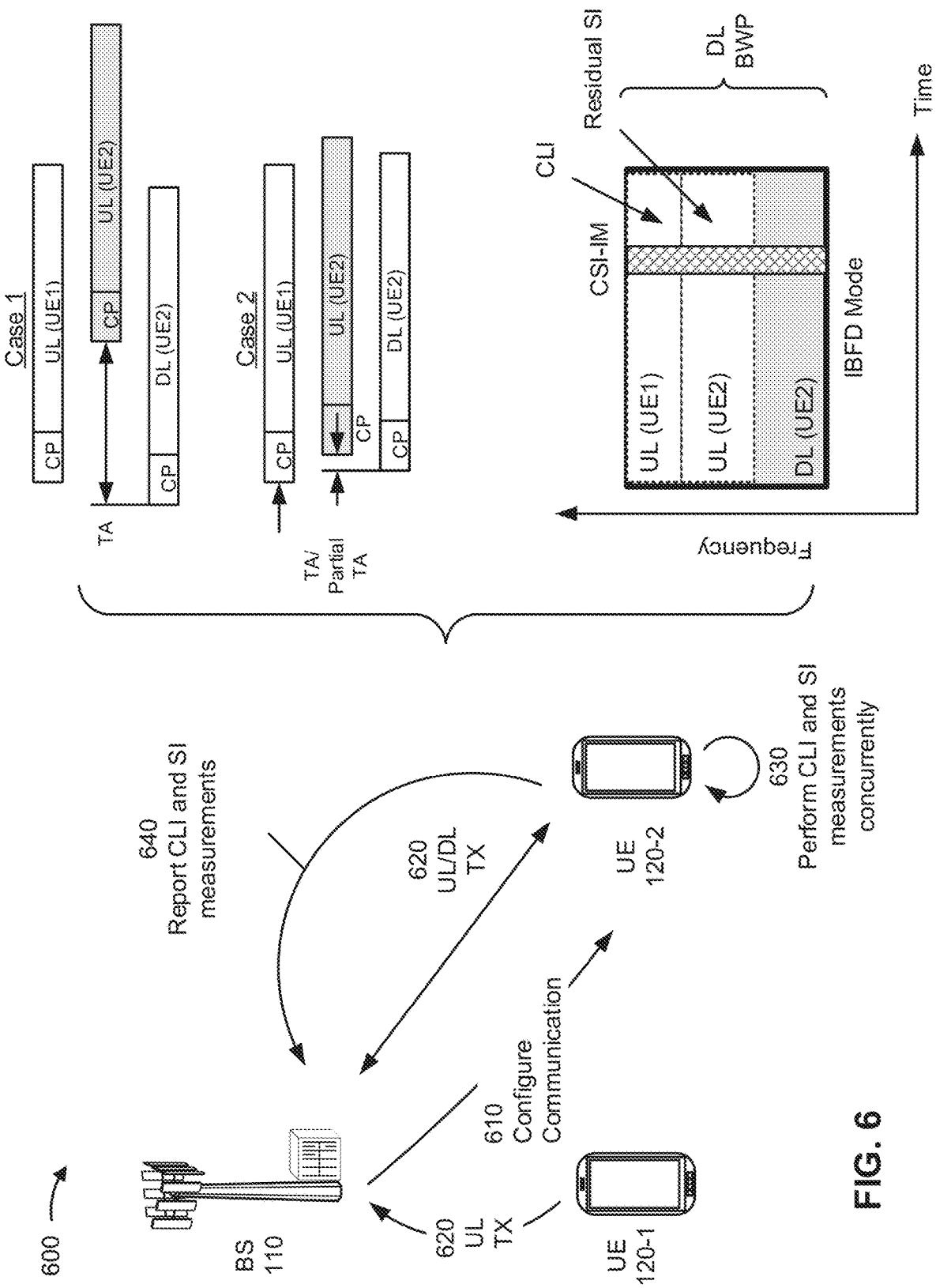
FIGS. 6 and 7 are diagrams illustrating examples associated with concurrent self-interference and cross-link interference measurement and reporting, in accordance with various aspects of the present disclosure.

FIG. 6 is a diagram illustrating an example 600 associated with concurrent SI and CLI measurement and reporting, in accordance with various aspects of the present disclosure. As shown in FIG. 6, example 600 includes communication between a BS 110 and a set of UEs 120 (e.g., a first UE 120-1 and a second UE 120-2). The BS 110 and the UEs 120 may be included in a wireless network, such as wireless network 100 illustrated and described above in connection with FIG. 1. The BS 110 and the UEs 120 may communicate on a wireless access link, which may include an uplink and a downlink.

As further shown in FIG. 6, and by reference number 610, BS 110 may configure communication. For example, BS 110 may configure communication for UE 120-1, UE 120-2, and/or the like. In some aspects, BS 110 may configure communication based at least in part on receiving UE capability information. For example, second UE 120-2 may provide signaling indicating support for an FD capability, a capability for performing a CLI measurement and an SI measurement concurrently, a capability for receiving a downlink signal within a particular symbol or in an adjacent symbol to the particular symbol, a capability for puncturing or rate-matching to perform the CLI measurement and the SI measurement concurrently, a capability for dynamic activation of puncturing or rate-matching, a capability of receiving a dynamic indication of puncturing or rate-matching pattern, and/or the like as described herein. In this case, BS 110 may configure communication resources, channel state information interference measurement (CSI-IM) resources, reporting resources, and/or the like based at least in part on receiving UE capability signaling. Additionally, or alternatively, BS 110 may configure a timing advance to align communications of, for example, first UE 120-1 and second UE 120-2, as described in more detail herein.

As further shown in FIG. 6, and by reference numbers 620 and 630, UE 120-2 may perform CLI and SI measurements concurrently on a set of UL transmissions, DL transmissions, and/or the like. for example, UE 120-1 may transmit on an uplink and UE 120-2 may transmit on an uplink, receive on a downlink, and perform the CLI and SI measurements. In some aspects, UE 120-2 may determine a timing for a CLI measurement. For example, UE 120-2 may determine a CLI receive time based at least in part on a scheduled uplink transmission time. In a first case as shown, UE 120-2 may determine that the CLI receive time is the same as the uplink transmit time and that UE 120-2 is to use the same Fast Fourier Transform (FFT) window to measure SI and CLI. Further, in this case, UE 120-2 may determine that downlink transmission and uplink transmission are offset based at least in part on a timing advance command, and that uplink transmission is within a threshold proximity (in time resources) of uplink transmission by UE 120-1. As a result. UE 120-2 may perform the SI and CLI measurement using, for example, the same symbol.

In some aspects, UE 120-2 may receive a downlink transmission within a threshold proximity (with regard to time resources) of performing the CLI measurement and the SI measurement. For example, when UE 120-2 is associated with a capability for FD operation, UE 120-2 may receive a PDCCH, a PDSCH, a CSI-RS, and/or the like in a second symbol adjacent to a first symbol within which UE 120-2 performs the CLI measurement and/or the SI measurement (e.g., without guard symbols between the first symbol and the second symbol). In this case, UE 120-2 may use a first FFT window for interference measurement and a second FFT window for receiving DL transmission. Additionally, or alternatively, BS 110 may configure reception and UE 120-2 may accordingly receive the downlink transmission in a second symbol separated by a set of guard symbols, such as one guard symbol, two guard symbols, and/or the like. In this case, UE 120-2 may adjust an FFT window time offset during the set of guard symbols.

In some aspects, BS 110 may configure, and UE 120-2 may use, a partial timing advance command to enable UE 120-2 to perform an SI measurement and a CLI measurement concurrently. For example, in a second case as shown, BS 110 may provide the partial timing advance command to UE 120-2 to achieve an alignment between a CLI receive time (e.g., corresponding to a transmit time by UE 120-1) and an SI receive time (e.g., corresponding to a transmit time by UE 120-2). In this case, BS 110 may configure an CSI-IM resource during which UE 120-2 is to perform the CLI measurement and a residual SI measurement, as shown.

In some aspects, UE 120-2 may use puncturing or rate-matching to perform the SI measurement and the CLI measurement concurrently. For example, when resources for the SI and CLI completely overlap in frequency. UE 120-2 may puncture or rate match an uplink transmission to enable performance of the SI and CLI measurements. In this case, UE 120-2 may puncture or rate-match a physical uplink shared channel (PUSCH) transmission and use a first subset of resource elements for CLI measurement and a second subset of resource elements for CLI measurement and SI measurement. Additionally, or alternatively. UE 120-2 and/or UE 120-1 may puncture or rate-match the PUSCH transmission using different puncturing or rate matching patterns, as described in more detail in connection with FIG. 7, such that, for example, UE 120-2 may use a first subset of resource elements for CLI measurement, a second subset of resource elements for SI measurement, a third subset of resource elements for SI and CLI measurement, and/or the like.

As further shown in FIG. 6, and by reference number 640, UE 120-2 may report a measurement. For example, UE 120-2 may report a CLI measurement, an SI measurement, and/or the like. In some aspects, UE 120-2 may report a measurement in accordance with a reporting configuration configured by BS 110. For example, BS 110 may configure second UE 120-2 to report a CLI received signal strength indicator (RSSI), a CLI reference signal received power (RSRP), and/or the like. Additionally, or alternatively, BS 110 may configure second UE 120-2 to report an SI RSSI, an SI RSRP, and/or the like. Additionally, or alternatively, BS 110 may configure second UE 120-2 to report a combination of a CLI RSSI and an SI RSSI, a combination of a CLI RSRP and an SI RSRP, and/or the like. Additionally, or alternatively, BS 110 may configure second UE 120-2 to report another type of quantity, another combination of quantities, and/or the like.

As indicated above, FIG. 6 is provided as an example. Other examples may differ from what is described with respect to FIG. 6.

Figure 7:
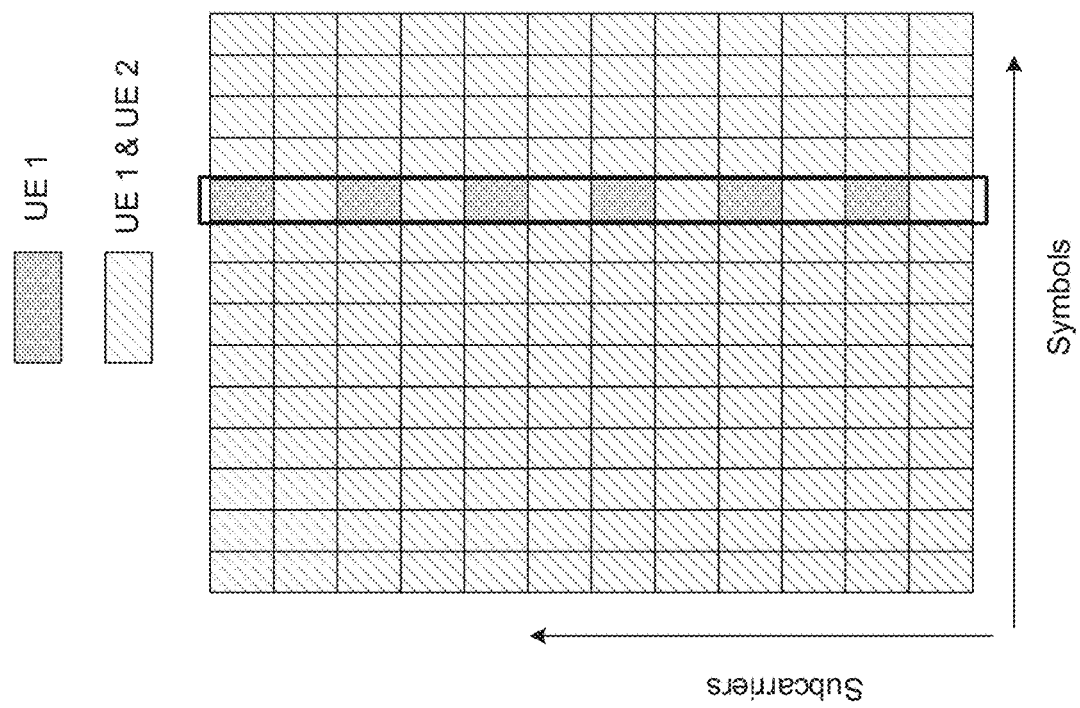

FIG. 7 is a diagram illustrating an example 700 associated with concurrent SI and CLI measurement and reporting, in accordance with various aspects of the present disclosure. As shown in FIG. 7, example 700 includes a resource grid for transmission of a first PUSCH by a first UE (e.g., UE 120-1 of FIG. 6) and transmission of a second PUSCH by a second UE (e.g., UE 120-2 of FIG. 6). In this case, frequency resources for the first PUSCH completely overlap with frequency resources for the second PUSCH.

In this case, the second UE may puncture or rate match PUSCH transmission to enable some resource elements to be reserved for CLI measurement and some other resource elements to be reserved for CLI and SI measurement. In this case, as shown, resource elements reserved for the first UE may only be used for CLI measurement and resources reserved for both the first UE and the second UE may be used for CLI and SI measurement.

In some aspects, the first UE and/or the second UE may puncture and/or rate match in accordance with a configured pattern. For example, a BS (e.g., BS 110 of FIG. 6) may indicate a puncturing or rate-matching pattern to the second UE via radio resource control (RRC) signaling. In this case, the BS semi-statically configures the puncturing or rate-matching pattern that the second UE is to use when requesting that the second UE measure and report SI and CLI concurrently on the same frequency resources. In some aspects, the second UE may always apply the puncturing or rate-matching pattern when configured. Additionally, or alternatively, the second UE may receive activation signaling (e.g., a downlink control information (DCI) or medium access control (MAC) control element) to dynamically activate or deactivate the puncturing or rate-matching pattern.

In some aspects, the second UE may receive a DCI triggering CLI and/or SI reporting and the DCI may include information indicating whether the second UE is to use puncturing or rate-matching, information indicating a pattern to use for puncturing or rate-matching, CSI-IM resources on which to perform a CLI and/or SI measurement, and/or the like. Additionally, or alternatively, the second UE may receive a group-common DCI triggering CLI and/or SI reporting and including information indicating whether the second UE is to use puncturing or rate-matching, information indicating a pattern to use for puncturing or rate-matching, CSI-IM resources on which to perform a CLI and/or SI measurement, and/or the like. Additionally, or alternatively, the second UE may autonomously determine the puncturing or rate-matching pattern based at least in part on determining that there is an overlap between a CSI-IM resource set associated with a report of a CLI measurement and a PUSCH transmission resource.

As indicated above, FIG. 7 is provided as an example. Other examples may differ from what is described with respect to FIG. 7.

Figure 8:
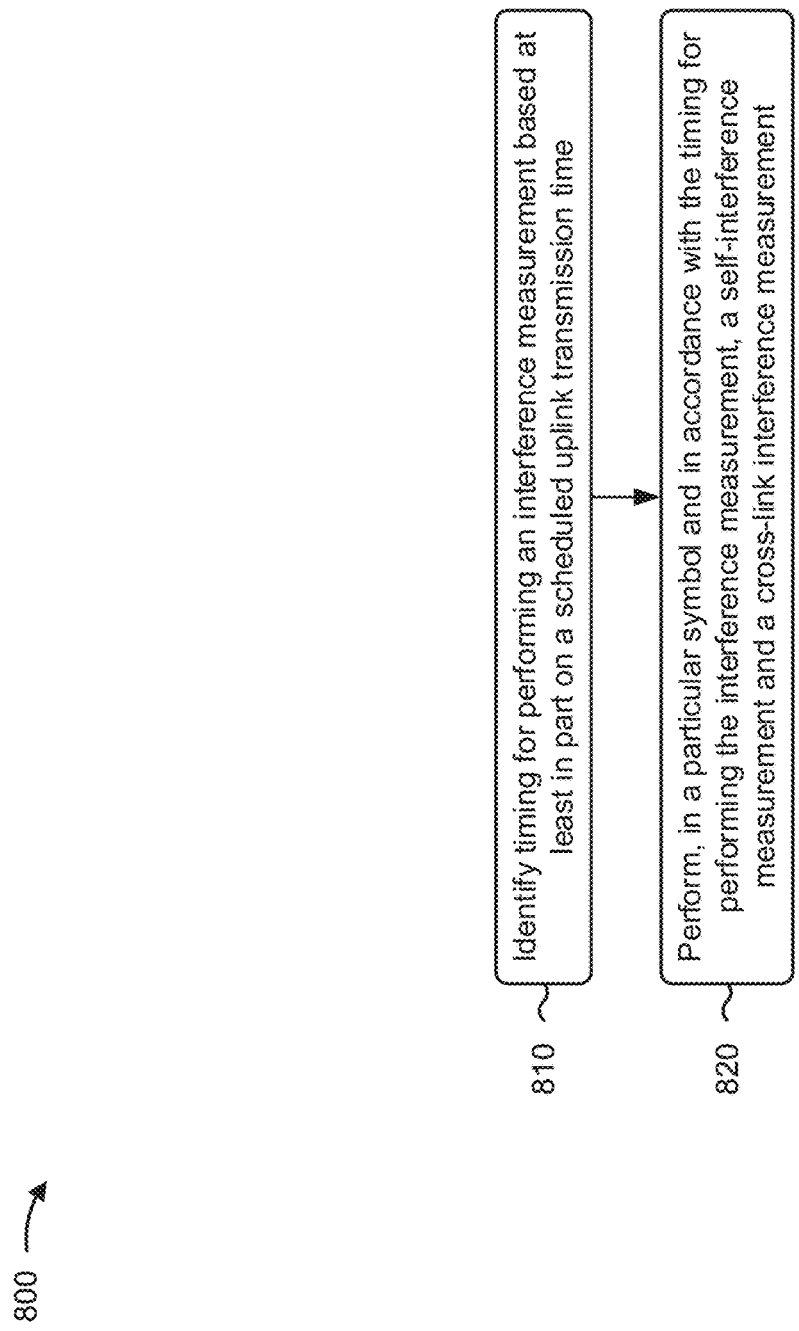
FIGS. 8 and 9 are diagrams illustrating example processes associated with concurrent self-interference and cross-link interference measurement and reporting, in accordance with various aspects of the present disclosure.

FIG. 8 is a diagram illustrating an example process 800 performed, for example, by a full-duplex UE, in accordance with various aspects of the present disclosure. Example process 800 is an example where the full-duplex UE (e.g., UE 120 and/or the like) performs operations associated with concurrent self-interference and cross-link interference measurement and reporting.

As shown in FIG. 8, in some aspects, process 800 may include identifying timing for performing an interference measurement based at least in part on a scheduled uplink transmission time (block 810). For example, the full-duplex UE (e.g., using receive processor 258, transmit processor 264, controller/processor 280, memory 282, and/or the like) may identify timing for performing an interference measurement based at least in part on a scheduled uplink transmission time, as described above.

As further shown in FIG. 8, in some aspects, process 800 may include performing, in a particular symbol and in accordance with the timing for performing the interference measurement, a self-interference measurement and a cross-link interference measurement (block 820). For example, the full-duplex UE (e.g., using receive processor 258, transmit processor 264, controller/processor 280, memory 282, and/or the like) may perform, in a particular symbol and in accordance with the timing for performing the interference measurement, a self-interference measurement and a cross-link interference measurement, as described above.

Process 800 may include additional aspects, such as any single aspect or any combination of aspects described below and/or in connection with one or more other processes described elsewhere herein.

In a first aspect, process 800 includes receiving, in the particular symbol or in another symbol adjacent to the particular symbol, a downlink communication.

In a second aspect, alone or in combination with the first aspect, the downlink communication comprises at least a physical downlink control channel transmission, a physical downlink shared channel transmission, channel state information reference signal, or a combination thereof.

In a third aspect, alone or in combination with one or more of the first and second aspects, process 800 includes receiving, in another symbol separated by less than a threshold quantity of guard symbols from the particular symbol, at least a physical downlink control channel transmission or a physical downlink shared channel transmission or channel state information reference signal, or a combination thereof.

In a fourth aspect, alone or in combination with one or more of the first through third aspects, determining the timing for performing the interference measurement comprises determining the timing for performing the interference measurement based at least in part on a partial timing advance; and configuring the partial timing advance at an interfering UE to time align an uplink transmission of the UE with an uplink transmission of the interfering UE.

In a fifth aspect, alone or in combination with one or more of the first through fourth aspects, a first frequency resource associated with the self-interference measurement completely overlaps with a second frequency resource associated with the cross-link interference measurement, and wherein performing the self-interference measurement and the cross-link interference measurement comprises puncturing or rate-matching a physical uplink shared channel transmission to use a first one or more resource elements of resources of the physical uplink shared channel transmission for the cross-link interference measurement and to use a second one or more resource elements of the resources of the physical uplink shared channel transmission for the cross-link interference measurement and the self-interference measurement.

In a sixth aspect, alone or in combination with one or more of the first through fifth aspects, a first frequency resource associated with the self-interference measurement completely overlaps with a second frequency resource associated with the cross-link interference measurement, and wherein performing the self-interference measurement and the cross-link interference measurement comprises puncturing or rate-matching a physical uplink shared channel transmission according to a configured puncturing or rate-matching pattern to use a first one or more resource elements of resources of the physical uplink shared channel transmission for the cross-link interference measurement and to use a second one or more resource elements of the resources of the physical uplink shared channel transmission for the self-interference measurement.

In a seventh aspect, alone or in combination with one or more of the first through sixth aspects, process 800 includes receiving signaling identifying a configuration of the puncturing or rate-matching pattern, wherein the signaling comprises at least radio resource control signaling, a downlink control information, a group-common downlink control information, or a combination thereof.

In an eighth aspect, alone or in combination with one or more of the first through seventh aspects, the configuration indicates at least a combination thereof.

In a ninth aspect, alone or in combination with one or more of the first through eighth aspects, the configured puncturing or rate-matching pattern is activated based at least in part on received signaling.

In a tenth aspect, alone or in combination with one or more of the first through ninth aspects, the configured puncturing or rate-matching pattern is activated based at least in part on reporting for the cross-link interference measurement and the self-interference measurement being scheduled on a common resource.

In an eleventh aspect, alone or in combination with one or more of the first through tenth aspects, process 800 includes identifying an overlap between a channel state information interference measurement resource set associated with a report of the cross-link interference measurement and a physical uplink shared channel transmission resource, and determining a configuration of the puncturing or rate-matching pattern based at least in part on identifying the overlap.

In a twelfth aspect, alone or in combination with one or more of the first through eleventh aspects, process 800 includes receiving information identifying a report configuration, wherein the report configuration comprises at least information identifying a cross-link interference-only reporting resource, a self-interference-only reporting resource, a joint cross-link interference and self-interference reporting resource, or a combination thereof.

In a thirteenth aspect, alone or in combination with one or more of the first through twelfth aspects, the report configuration includes information identifying whether to report a reference signal received power or a received signal strength indicator.

In a fourteenth aspect, alone or in combination with one or more of the first through thirteenth aspects, process 800 includes transmitting signaling indicating at least a full-duplex capability, a capability for performing the cross-link interference measurement and the self-interference measurement concurrently, a capability for receiving a downlink signal within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
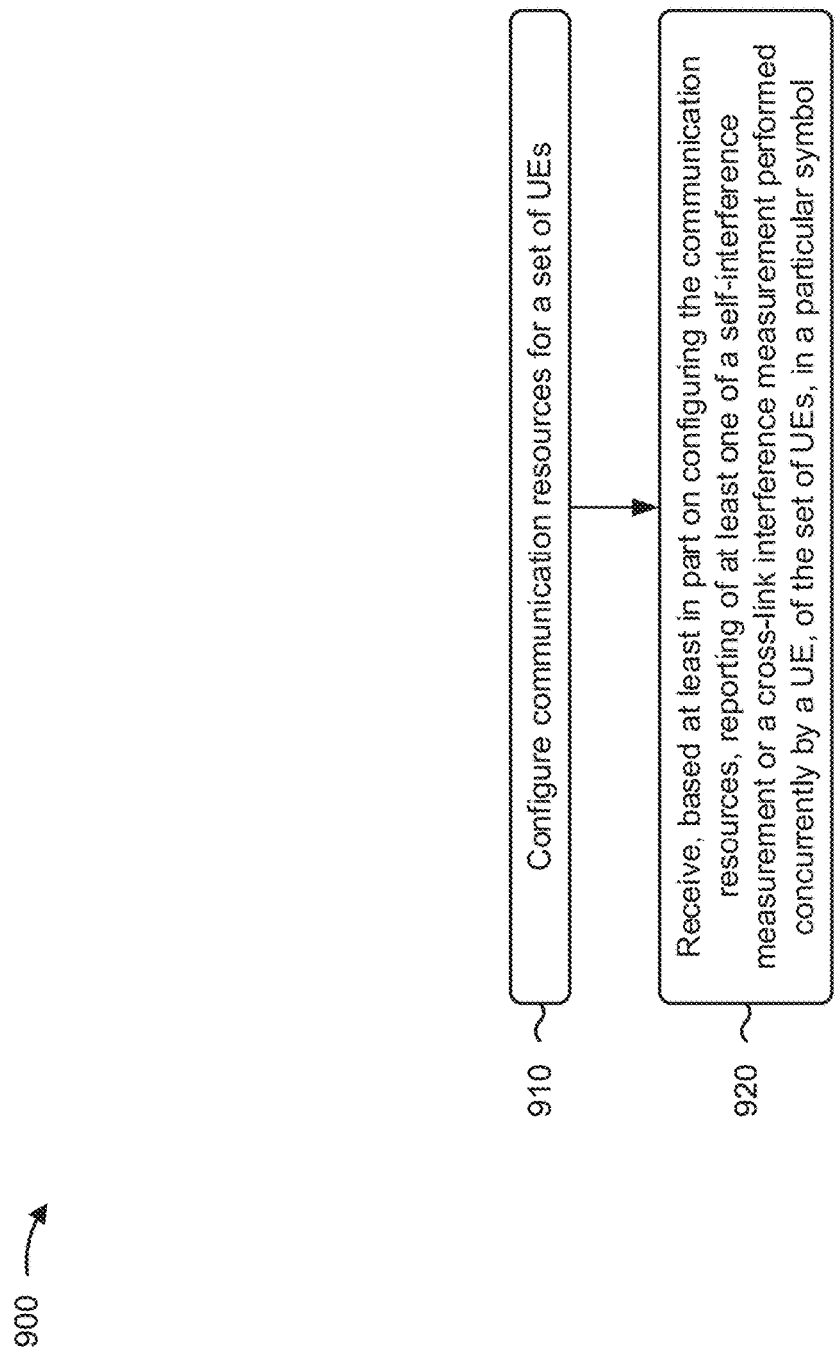

FIG. 9 is a diagram illustrating an example process 900 performed, for example, by a BS, in accordance with various aspects of the present disclosure. Example process 900 is an example where the BS (e.g., BS 110 and/or the like) performs operations associated with concurrent self-interference and cross-link interference measurement and reporting.

As shown in FIG. 9, in some aspects, process 900 may include configuring communication resources for a set of UEs (block 910). For example, the BS (e.g., using transmit processor 220, receive processor 238, controller/processor 240, memory 242, and/or the like) may configure communication resources for a set of UEs, as described above.

As further shown in FIG. 9, in some aspects, process 900 may include receiving, based at least in part on configuring the communication resources, reporting of at least one of a self-interference measurement or a cross-link interference measurement performed concurrently by a UE, of the set of UEs, in a particular symbol (block 920). For example, the BS (e.g., using transmit processor 220, receive processor 238, controller/processor 240, memory 242, and/or the like) may receive, based at least in part on configuring the communication resources, reporting of at least one of a self-interference measurement or a cross-link interference measurement performed concurrently by a UE, of the set of UEs, in a particular symbol, as described above.

Process 900 may include additional aspects, such as any single aspect or any combination of aspects described below and/or in connection with one or more other processes described elsewhere herein.

In a first aspect, the communication resources comprise at least a channel state information interference measurement resource, a physical uplink shared channel resource, a sounding reference signal resource, or a combination thereof.

In a second aspect, alone or in combination with the first aspect, process 900 includes transmitting, in the particular symbol or in another symbol adjacent to the particular symbol, a downlink communication.

In a third aspect, alone or in combination with one or more of the first and second aspects, the downlink communication comprises at least a physical downlink control channel transmission, a physical downlink shared channel transmission, channel state information reference signal, or a combination thereof.

In a fourth aspect, alone or in combination with one or more of the first through third aspects, process 900 includes transmitting, in another symbol separated by less than a threshold quantity of guard symbols from the particular symbol, at least a physical downlink control channel transmission, a physical downlink shared channel transmission, a channel state information reference signal, or a combination thereof.

In a fifth aspect, alone or in combination with one or more of the first through fourth aspects, configuring the communication resources comprises determining a timing for performing the interference measurement based at least in part on a partial timing advance; and configuring the partial timing advance at an interfering UE to time align an uplink transmission of the UE with an uplink transmission of the interfering UE.

In a sixth aspect, alone or in combination with one or more of the first through fifth aspects, a first frequency resource associated with the self-interference measurement completely overlaps with a second frequency resource associated with the cross-link interference measurement, and wherein the self-interference measurement and the cross-link interference measurement are performed using puncturing or rate-matching of a physical uplink shared channel transmission.

In a seventh aspect, alone or in combination with one or more of the first through sixth aspects, process 900 includes transmitting signaling identifying a configuration for the puncturing or rate-matching, wherein the signaling comprises at least radio resource control signaling, a downlink control information, a group-common downlink control information, or a combination thereof.

In an eighth aspect, alone or in combination with one or more of the first through seventh aspects, the configuration indicates at least a combination thereof.

In a ninth aspect, alone or in combination with one or more of the first through eighth aspects, transmitting the signaling comprises transmitting the signaling to activate puncturing or rate-matching.

In a tenth aspect, alone or in combination with one or more of the first through ninth aspects, process 900 includes scheduling reporting for the cross-link interference measurement and the self-interference measurement being scheduled on a common resource to activate puncturing or rate-matching.

In an eleventh aspect, alone or in combination with one or more of the first through tenth aspects, process 900 includes transmitting information identifying a report configuration, wherein the report configuration comprises at least information identifying a cross-link interference-only reporting resource, a self-interference-only reporting resource, a joint cross-link interference and self-interference reporting resource, or a combination thereof.

In a twelfth aspect, alone or in combination with one or more of the first through eleventh aspects, the report configuration includes information identifying whether to the UE is to report a reference signal received power or a received signal strength indicator.

In a thirteenth aspect, alone or in combination with one or more of the first through twelfth aspects, process 900 includes receiving signaling indicating at least a full-duplex capability, a capability for performing the cross-link interference measurement and the self-interference measurement concurrently, a capability for performing the cross-link interference measurement and the self-interference measurement within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern, or a combination thereof.

In a fourteenth aspect, alone or in combination with one or more of the first through thirteenth aspects, configuring the communication resources comprises configuring the communication resources based at least in part on the received signaling.

Although FIG. 9 shows example blocks of process 900, in some aspects, process 900 may include additional blocks, fewer blocks, different blocks, or differently arranged blocks than those depicted in FIG. 9. Additionally. or alternatively, two or more of the blocks of process 900 may be performed in parallel.

Figure 10:
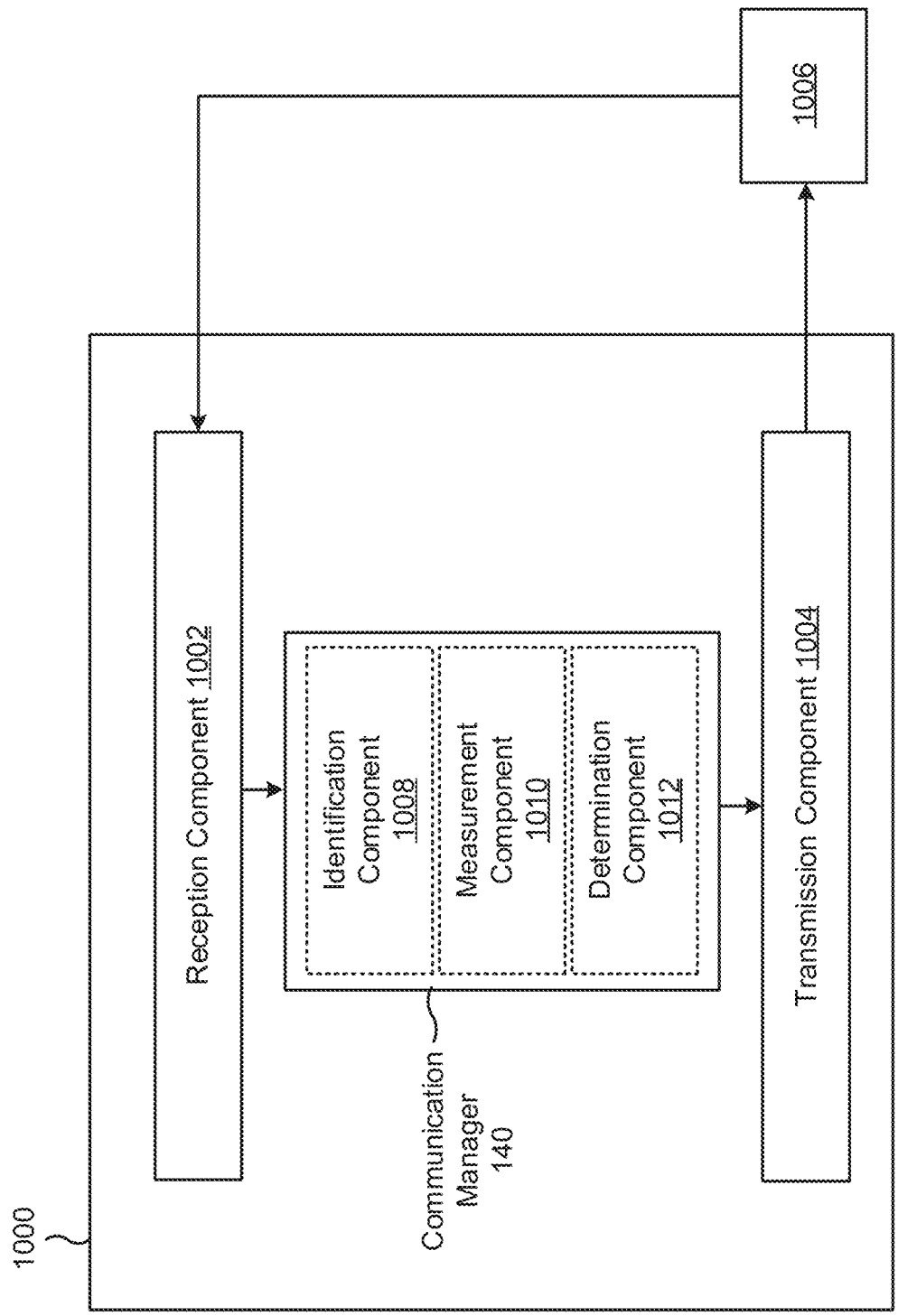
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE (e.g., a full-duplex UE), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an identification component 1008, a measurement component 1010, or a determination component 1012, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The identification component 1008 may identify timing for performing an interference measurement based at least in part on a scheduled uplink transmission time. The measurement component 1010 may perform, in a particular symbol and in accordance with the timing for performing the interference measurement, a self-interference measurement and a cross-link interference measurement. The reception component 1002 may receive, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

The reception component 1002 may receive, in another symbol separated by less than a threshold quantity of guard symbols from the particular symbol, at least a physical downlink control channel transmission or a physical downlink shared channel transmission or channel state information reference signal, or a combination thereof. The reception component 1002 may receive signaling identifying a configuration of the puncturing or rate-matching pattern wherein the signaling comprises at least: radio resource control signaling, a downlink control information, a group-common downlink control information, or a combination thereof. The identification component 1008 may identify an overlap between a channel state information interference measurement resource set associated with a report of the cross-link interference measurement and a physical uplink shared channel transmission resource.

The determination component 1012 may determine a configuration of the puncturing or rate-matching pattern based at least in part on identifying the overlap. The reception component 1002 may receive information identifying a report configuration wherein the report configuration comprises at least information identifying: a cross-link interference-only reporting resource. The transmission component 1004 may transmit signaling indicating at least a full-duplex capability, a capability for performing the cross-link interference measurement and the self-interference measurement concurrently, a capability for receiving a downlink signal within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern, or a combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
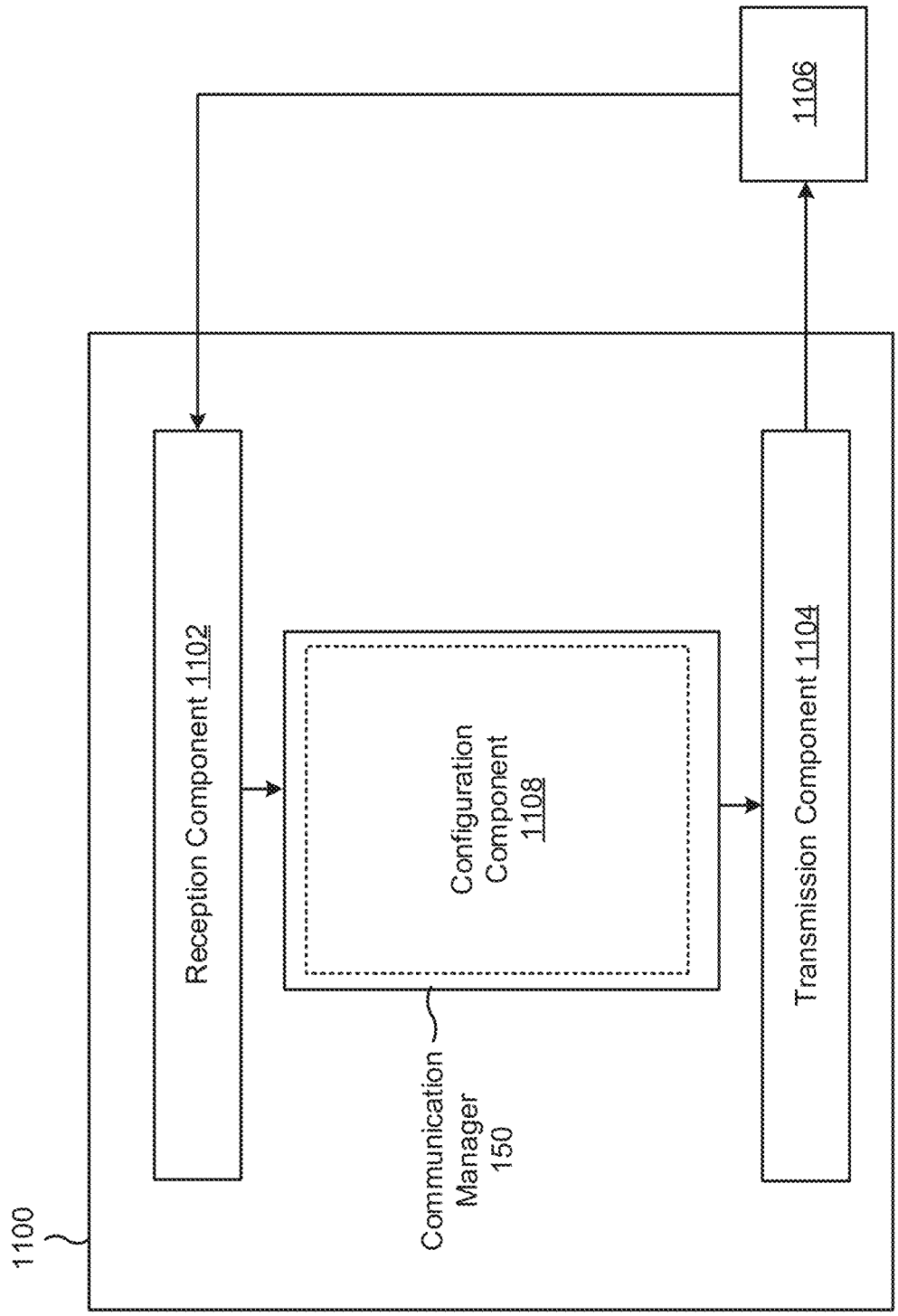

FIG. 11 is a block diagram of an example apparatus 1100 for wireless communication. The apparatus 1100 may be a BS, or a BS may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the BS described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the BS described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the BS described above in connection with FIG. 2. In some aspects, the transmission component 1104 may be co-located with the reception component 1102 in a transceiver.

The configuration component 1108 may configure communication resources for a set of UEs. The reception component 1102 may receive, based at least in part on configuring the communication resources, reporting of at least one of a self-interference measurement or a cross-link interference measurement performed concurrently by a UE, of the set of UEs, in a particular symbol. The transmission component 1104 may transmit, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

The transmission component 1104 may transmit, in another symbol separated by less than a threshold quantity of guard symbols from the particular symbol, at least a physical downlink control channel transmission, a physical downlink shared channel transmission, a channel state information reference signal, or a combination thereof. The transmission component 1104 may transmit signaling identifying a configuration for the puncturing or rate-matching wherein the signaling comprises at least: radio resource control signaling, a downlink control information, a group-common downlink control information, or a combination thereof. The transmission component 1104 may transmit information identifying a report configuration wherein the report configuration comprises at least information identifying: a cross-link interference-only reporting resource.

The reception component 1102 may receive signaling indicating at least a full-duplex capability, a capability for performing the cross-link interference measurement and the self-interference measurement concurrently, a capability for receiving a downlink signal within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a full-duplex user equipment (UE), comprising: identifying timing for performing an interference measurement based at least in part on a scheduled uplink transmission time; and performing, in a particular symbol and in accordance with the timing for performing the interference measurement, a self-interference measurement and a cross-link interference measurement.

Aspect 2: The method of Aspect 1, further comprising: receiving, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

Aspect 3: The method of any of Aspects 1 to 2, further comprising: receiving, in another symbol separated by less than a threshold quantity of guard symbols from the particular symbol, at least a physical downlink control channel transmission or a physical downlink shared channel transmission or channel state information reference signal, or a combination thereof.

Aspect 4: The method of any of Aspects 1 to 3, wherein determining the timing for performing the interference measurement comprises: determining the timing for performing the interference measurement based at least in part on a partial timing advance, wherein the partial timing advance is configured to time align an uplink transmission of the UE with one or more uplink transmissions of one or more interfering UEs.

Aspect 5: The method of any of Aspects 1 to 4, wherein a first frequency resource associated with the self-interference measurement completely overlaps with a second frequency resource associated with the cross-link interference measurement, and wherein performing the self-interference measurement and the cross-link interference measurement comprises: puncturing or rate-matching a physical uplink shared channel transmission according to a configured puncturing or rate-matching pattern to use a first one or more resource elements of resources of the physical uplink shared channel transmission for the cross-link interference measurement and to use a second one or more resource elements of the resources of the physical uplink shared channel transmission for the self-interference measurement.

Aspect 6: The method of Aspect 5, further comprising: receiving signaling identifying a configuration of the puncturing or rate-matching pattern, wherein the signaling comprises at least: radio resource control signaling, a downlink control information, a group-common downlink control information, or a combination thereof.

Aspect 7: The method of Aspect 6, wherein the configuration indicates at least: a combination thereof.

Aspect 8: The method of any of Aspects 6 to 7, wherein the configured puncturing or rate-matching pattern is activated based at least in part on received signaling.

Aspect 9: The method of any of Aspects 6 to 8, wherein the configured puncturing or rate-matching pattern is activated based at least in part on reporting for the cross-link interference measurement and the self-interference measurement being scheduled on a common resource.

Aspect 10: The method of any of Aspects 5 to 9, further comprising: identifying an overlap between a channel state information interference measurement resource set associated with a report of the cross-link interference measurement and a physical uplink shared channel transmission resource; and determining a configuration of the puncturing or rate-matching pattern based at least in part on identifying the overlap.

Aspect 11: The method of any of Aspects 1 to 10, further comprising: receiving information identifying a report configuration, wherein the report configuration comprises at least information identifying: a cross-link interference-only reporting resource, a self-interference-only reporting resource, a joint cross-link interference and self-interference reporting resource, or a combination thereof.

Aspect 12: The method of any of Aspects 1 to 11, further comprising: transmitting signaling indicating at least: a full-duplex capability, a capability for performing the cross-link interference measurement and the self-interference measurement concurrently, a capability for receiving a downlink signal within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern, or a combination thereof.

Aspect 13: A method of wireless communication performed by a base station (BS), comprising: configuring communication resources for a set of user equipment (UEs); and receiving, based at least in part on configuring the communication resources, reporting of at least one of a self-interference measurement or a cross-link interference measurement performed concurrently by a UE, of the set of UEs, in a particular symbol.

Aspect 14: The method of Aspect 13, wherein the communication resources comprise at least a channel state information interference measurement resource, a physical uplink shared channel resource, a sounding reference signal resource, or a combination thereof.

Aspect 15: The method of any of Aspects 13 to 14, further comprising: transmitting, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

Aspect 16: The method of any of Aspects 13 to 15, further comprising: transmitting, in another symbol separated by less than a threshold quantity of guard symbols from the particular symbol, at least a physical downlink control channel transmission, a physical downlink shared channel transmission, a channel state information reference signal, or a combination thereof.

Aspect 17: The method of any of Aspects 13 to 16, wherein configuring the communication resources comprises: determining a timing for performing the interference measurement based at least in part on a partial timing advance; and configuring the partial timing advance at an interfering UE to time align an uplink transmission of the UE with an uplink transmission of the interfering UE.

Aspect 18 The method of any of Aspects 13 to 17, wherein a first frequency resource associated with the self-interference measurement completely overlaps with a second frequency resource associated with the cross-link interference measurement, and wherein the self-interference measurement and the cross-link interference measurement are performed using puncturing or rate-matching of a physical uplink shared channel transmission.

Aspect 19: The method of Aspect 18, further comprising: transmitting signaling identifying a configuration for the puncturing or rate-matching, wherein the signaling comprises at least: radio resource control signaling, a downlink control information, a group-common downlink control information, or a combination thereof.

Aspect 20: The method of Aspect 19, wherein the configuration indicates at least: a combination thereof.

Aspect 21: The method of any of Aspects 19 to 20, wherein transmitting the signaling comprises: transmitting the signaling to activate puncturing or rate-matching.

Aspect 22: The method of any of Aspects 19 to 21, further comprising: scheduling reporting for the cross-link interference measurement and the self-interference measurement on a common resource to activate puncturing or rate-matching.

Aspect 23: The method of any of Aspects 13 to 22, further comprising: transmitting information identifying a report configuration, wherein the report configuration comprises at least information identifying: a cross-link interference-only reporting resource, a self-interference-only reporting resource, a joint cross-link interference and self-interference reporting resource, or a combination thereof Aspect 24: The method of Aspect 23, wherein the report configuration includes information identifying whether to the UE is to report a reference signal received power or a received signal strength indicator.

Aspect 25: The method of any of Aspects 13 to 24, further comprising: receiving signaling indicating at least: a full-duplex capability, a capability for performing the cross-link interference measurement and the self-interference measurement concurrently, a capability for receiving a downlink signal within the particular symbol or in an adjacent symbol to the particular symbol, a capability for puncturing or rate-matching to perform the cross-link interference measurement and the self-interference measurement concurrently, a capability for dynamic activation of puncturing or rate-matching, a capability of receiving a dynamic indication of puncturing or rate-matching pattern, or a combination thereof. a combination thereof.

Aspect 26: The method of Aspect 25, wherein configuring the communication resources comprises: configuring the communication resources based at least in part on the received signaling.

Aspect 27: An apparatus for wireless communication at a device, comprising a processor; memory coupled with the processor; and instructions stored in the memory and executable by the processor to cause the apparatus to perform the method of one or more Aspects of Aspects 1-12.

Aspect 28: A device for wireless communication, comprising a memory and one or more processors coupled to the memory, the memory and the one or more processors configured to perform the method of one or more Aspects of Aspects 1-12.

Aspect 29: An apparatus for wireless communication, comprising at least one means for performing the method of one or more Aspects of Aspects 1-12.

Aspect 30: A non-transitory computer-readable medium storing code for wireless communication, the code comprising instructions executable by a processor to perform the method of one or more Aspects of Aspects 1-12.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 32: An apparatus for wireless communication at a device, comprising a processor; memory coupled with the processor; and instructions stored in the memory and executable by the processor to cause the apparatus to perform the method of one or more Aspects of Aspects 13-26.

Aspect 33: A device for wireless communication, comprising a memory and one or more processors coupled to the memory, the memory and the one or more processors configured to perform the method of one or more Aspects of Aspects 13-26.

Aspect 34: An apparatus for wireless communication, comprising at least one means for performing the method of one or more Aspects of Aspects 13-26.

Aspect 35: A non-transitory computer-readable medium storing code for wireless communication, the code comprising instructions executable by a processor to perform the method of one or more Aspects of Aspects 13-26.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 13-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories storing processor-readable code; and
   one or more processors, coupled with the one or more memories, at least one processor of the one or more processors configured to cause the UE to:
      transmit signaling indicating a capability for performing a cross-link interference measurement and a self-interference measurement concurrently;
      identify timing for performing an interference measurement in accordance with a scheduled uplink transmission time; and
      perform, in accordance with the timing for performing the interference measurement, the self-interference measurement, using a first one or more resource elements of resources of a physical uplink shared channel transmission, and the cross-link interference measurement, using a second one or more resource elements of the resources of the physical uplink shared channel transmission, in a particular symbol concurrently in accordance with the capability, wherein the second one or more resource elements are different from the first one or more resource elements in the particular symbol.

2. The UE of claim 1, wherein at least one processor of the one or more processors is further configured to:
   receive, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

3. The UE of claim 1, wherein at least one processor of the one or more processors is further configured to:
   receive, in another symbol separated by less than a threshold quantity of guard symbols from the particular symbol, at least a physical downlink control channel transmission or a physical downlink shared channel transmission or channel state information reference signal, or a combination thereof.

4. The UE of claim 1, wherein at least one processor of the one or more processors, to determine the timing for performing the interference measurement, is configured to:
   determine the timing for performing the interference measurement in accordance with a partial timing advance, wherein the partial timing advance is configured to time align an uplink transmission of the UE with one or more uplink transmissions of one or more interfering UEs.

5. The UE of claim 1, wherein a first frequency resource associated with the self-interference measurement completely overlaps with a second frequency resource associated with the cross-link interference measurement, and
   wherein the at least one processor of the one or more processors, to perform the self-interference measurement and the cross-link interference measurement, is configured to:
      puncture or rate-match the physical uplink shared channel transmission according to a configured puncturing or rate-matching pattern.

6. The UE of claim 5, wherein at least one processor of the one or more processors is further configured to:
   receive signaling identifying a configuration of the puncturing or rate-matching pattern,
      wherein the signaling comprises at least:
         radio resource control signaling,
         a downlink control information,
         a group-common downlink control information, or
         a combination thereof.

7. The UE of claim 6, wherein the configuration indicates at least:
   a combination thereof.

8. The UE of claim 6, wherein the configured puncturing or rate-matching pattern is activated in accordance with received signaling.

9. The UE of claim 6, wherein the configured puncturing or rate-matching pattern is activated in accordance with reporting for the cross-link interference measurement and the self-interference measurement being scheduled on a common resource.

10. The UE of claim 5, wherein at least one processor of the one or more processors is further configured to:
    identify an overlap between a channel state information interference measurement resource set associated with a report of the cross-link interference measurement and a physical uplink shared channel transmission resource; and determine a configuration of the puncturing or rate-matching pattern in accordance with identifying the overlap.

11. The UE of claim 1, wherein at least one processor of the one or more processors is further configured to:
receive information identifying a report configuration, wherein the report configuration comprises at least information identifying:
a cross-link interference-only reporting resource,
a self-interference-only reporting resource,
a joint cross-link interference and self-interference reporting resource, or
a combination thereof.

12. The UE of claim 1, wherein at least one processor of the one or more processors is further configured to:
transmit additional signaling indicating at least:
a full-duplex capability,
a capability for receiving a downlink signal within the particular symbol or in an adjacent symbol to the particular symbol,
a capability for puncturing or rate-matching to perform the cross-link interference measurement and the self-interference measurement concurrently,
a capability for dynamic activation of puncturing or rate-matching,
a capability of receiving a dynamic indication of puncturing or rate-matching pattern, or
a combination thereof.

13. A base station (BS) for wireless communication, comprising:
one or more memories storing processor-readable code; and
one or more processors, coupled with the one or more memories, at least one processor of the one or more processors configured to cause the BS to:
receive signaling indicating a capability of a user equipment (UE) for performing a cross-link interference measurement and a self-interference measurement concurrently;
configure communication resources for a set of user equipments (UEs); and
receive, in accordance with configuring the communication resources, a report, of the self-interference measurement and the cross-link interference measurement, wherein the self-interference measurement is performed in a first one or more resource elements of resources of a physical uplink shared channel transmission and the cross-link interference measurement is performed in a second one or more resource elements of the resources of the physical uplink shared channel transmission, and the self-interference measurement and the cross-link interference measurement are performed in a particular symbol concurrently by the UE, of the set of UEs, wherein the second one or more resource elements are different from the first one or more resource elements.

14. The BS of claim 13, wherein the communication resources comprise at least a channel state information interference measurement resource, a physical uplink shared channel resource, a sounding reference signal resource, or a combination thereof.

15. The BS of claim 13, wherein at least one processor of the one or more processors is further configured to:
transmit, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

16. The BS of claim 13, wherein at least one processor of the one or more processors is further configured to:
transmit, in another symbol separated by less than a threshold quantity of guard symbols from the particular symbol, at least a physical downlink control channel transmission, a physical downlink shared channel transmission, a channel state information reference signal, or a combination thereof.

17. The BS of claim 13, wherein at least one processor of the one or more processors, to configure the communication resources, is configured to:
determine a timing for performing the self-interference measurement and the cross-link interference measurement in accordance with a partial timing advance; and
configure the partial timing advance at an interfering UE to time align an uplink transmission of the UE with an uplink transmission of the interfering UE.

18. The BS of claim 13, wherein a first frequency resource associated with the self-interference measurement completely overlaps with a second frequency resource associated with the cross-link interference measurement, and
wherein the self-interference measurement and the cross-link interference measurement are performed using puncturing or rate-matching of the physical uplink shared channel transmission.

19. The BS of claim 18, wherein at least one processor of the one or more processors is further configured to:
transmit signaling identifying a configuration for the puncturing or rate-matching,
wherein the signaling comprises at least:
radio resource control signaling,
a downlink control information,
a group-common downlink control information, or
a combination thereof.

20. The BS of claim 19, wherein the configuration indicates at least:
a combination thereof.

21. The BS of claim 19, wherein at least one processor of the one or more processors is further configured to:
transmit the signaling to activate puncturing or rate-matching.

22. The BS of claim 19, wherein at least one processor of the one or more processors is further configured to:
schedule the report for the cross-link interference measurement and the self-interference measurement on a common resource to activate puncturing or rate-matching.

23. The BS of claim 13, wherein at least one processor of the one or more processors is further configured to:
transmit information identifying a report configuration, wherein the report configuration comprises at least information identifying:
a cross-link interference-only reporting resource,
a self-interference-only reporting resource,
a joint cross-link interference and self-interference reporting resource, or
a combination thereof.

24. The BS of claim 23, wherein the report configuration includes information identifying whether to the UE is to report a reference signal received power or a received signal strength indicator.

25. The BS of claim 13, wherein at least one processor of the one or more processors is further configured to:

receive additional signaling indicating at least:
  a full-duplex capability,
  a capability for receiving a downlink signal within the particular symbol or in an adjacent symbol to the particular symbol,
  a capability for puncturing or rate-matching to perform the cross-link interference measurement and the self-interference measurement concurrently,
  a capability for dynamic activation of puncturing or rate-matching,
  a capability of receiving a dynamic indication of puncturing or rate-matching pattern, or
  a combination thereof.

26. The BS of claim 25, wherein at least one processor of the one or more processors, to configure the communication resources, is configured to:
  configure the communication resources in accordance with the received signaling.

27. A method of wireless communication performed by a user equipment (UE), comprising:
  transmitting signaling indicating a capability for performing a cross-link interference measurement and a self-interference measurement concurrently;
  identifying timing for performing an interference measurement in accordance with a scheduled uplink transmission time; and
  performing, in accordance with the timing for performing the interference measurement, the self-interference measurement, using a first one or more resource elements of resources of a physical uplink shared channel transmission, and the cross-link interference measurement, using a second one or more resource elements of the resources of the physical uplink shared channel transmission, in a particular symbol concurrently in accordance with the capability, wherein the second one or more resource elements are different from the first one or more resource elements in the particular symbol.

28. The method of claim 27, further comprising:
  receiving, in the particular symbol or in another symbol adjacent to the particular symbol, a downlink communication, wherein the downlink communication comprises at least a physical downlink control channel transmission, a physical downlink shared channel transmission, channel state information reference signal, or a combination thereof.

29. A method of wireless communication performed by a base station (BS), comprising:
  receiving signaling indicating a capability of a user equipment (UE) for performing a cross-link interference measurement and a self-interference measurement concurrently;
  configuring communication resources for a set of user equipments (UEs); and
  receiving, in accordance with configuring the communication resources, a report, of the self-interference measurement and the cross-link interference measurement, wherein the self-interference measurement is performed in a first one or more resource elements of resources of a physical uplink shared channel transmission and the cross-link interference measurement is performed in a second one or more resource elements of the resources of the physical uplink shared channel transmission, and the self-interference measurement and the cross-link interference measurement are performed in a particular symbol concurrently by the UE, of the set of UEs, wherein the second one or more resource elements are different from the first one or more resource elements.

30. The method of claim 29, wherein the communication resources comprise at least a channel state information interference measurement resource, a physical uplink shared channel resource, a sounding reference signal resource, or a combination thereof.

* * * * *